US008336951B2

(12) United States Patent
Ichihara et al.

(10) Patent No.: US 8,336,951 B2
(45) Date of Patent: Dec. 25, 2012

(54) MUD GUARD STRUCTURE HAVING WINDOWS

(75) Inventors: Fumio Ichihara, Hyogo (JP); Ken Mogari, Kobe (JP)

(73) Assignees: Kawasaki Jukogyo Kabushiki Kaisha, Hyogo (JP); Sank Co., Ltd., Osaka (JP)

( * ) Notice: Subject to any disclaimer, the term of this patent is extended or adjusted under 35 U.S.C. 154(b) by 120 days.

(21) Appl. No.: 12/648,222

(22) Filed: Dec. 28, 2009

(65) Prior Publication Data
US 2011/0156438 A1 Jun. 30, 2011

(51) Int. Cl.
*B62D 33/00* (2006.01)
(52) U.S. Cl. ................................................ 296/181.1
(58) Field of Classification Search .............. 296/181.1, 296/146.1, 146.5, 146.6, 181.12, 155; 280/848, 280/847, 154, 770, 851; 180/219; 49/56
See application file for complete search history.

(56) References Cited

U.S. PATENT DOCUMENTS

| | | | | |
|---|---|---|---|---|
| 1,697,517 A | * | 1/1929 | Sullivan | 49/378 |
| 2,138,463 A | * | 11/1938 | Vincent | 296/155 |
| 2,187,935 A | * | 1/1940 | Craig | 180/271 |
| 2,248,319 A | * | 7/1941 | Waterhouse, Jr. | 296/203.01 |
| 2,567,153 A | * | 9/1951 | Jackson et al. | 49/166 |
| 2,682,427 A | * | 6/1954 | Bright | 296/148 |
| 2,775,478 A | * | 12/1956 | Stimetz et al. | 49/239 |
| 3,027,185 A | * | 3/1962 | Allen et al. | 292/280 |
| 3,166,783 A | * | 1/1965 | Mackie et al. | 16/302 |
| 3,391,628 A | * | 7/1968 | Ziegenfelder | 454/164 |
| 3,431,588 A | * | 3/1969 | Frey | 16/334 |
| 4,370,829 A | * | 2/1983 | Wagner | 49/388 |
| 4,866,883 A | * | 9/1989 | Brown et al. | 49/502 |
| 4,941,258 A | * | 7/1990 | Wright | 29/858 |
| 4,989,313 A | * | 2/1991 | Dzurko et al. | 29/281.4 |
| 5,004,286 A | * | 4/1991 | Taylor et al. | 296/24.46 |
| 5,203,601 A | * | 4/1993 | Guillot | 296/77.1 |
| 5,365,649 A | * | 11/1994 | Carl et al. | 29/267 |
| 5,743,010 A | * | 4/1998 | Zaguskin et al. | 29/857 |
| 5,794,309 A | * | 8/1998 | Lotz | 16/334 |
| 5,806,917 A | * | 9/1998 | Townsend | 296/202 |
| 6,178,599 B1 | * | 1/2001 | Worden et al. | 16/386 |
| 6,231,112 B1 | * | 5/2001 | Fukumoto et al. | 296/146.5 |
| 6,293,610 B1 | * | 9/2001 | Howard | 296/148 |
| 6,561,572 B1 | * | 5/2003 | Martin, Jr. | 296/190.1 |
| 6,575,525 B2 | * | 6/2003 | Traister et al. | 296/187.12 |
| 6,959,957 B2 | * | 11/2005 | Fukuchi et al. | 296/146.5 |
| 7,530,623 B2 | * | 5/2009 | Hampel | 296/146.11 |
| 7,640,697 B2 | * | 1/2010 | Florentin et al. | 49/348 |
| RE41,143 E | * | 2/2010 | Rangnekar et al. | 296/146.11 |
| 7,992,925 B2 | * | 8/2011 | Lagrut | 296/187.09 |
| 2005/0098371 A1 | * | 5/2005 | Zabtcioglu | 180/271 |
| 2009/0271949 A1 | * | 11/2009 | Sprague et al. | 16/382 |
| 2010/0024164 A1 | * | 2/2010 | Machin et al. | 16/258 |

FOREIGN PATENT DOCUMENTS

JP 61-51221 4/1986

* cited by examiner

*Primary Examiner* — Kiran B Patel

(57) ABSTRACT

A window-defined mud guard assembly includes mud guards fitted to a side of a vehicle body for selectively opening or closing a lower side portion of a vehicle cabin and window units mounted above the mud guards. Each of the window units is made up of a window body disposed above the corresponding mud guard and a connecting element for connecting the window body with an associated to-be-connected element provided in the mud guard.

11 Claims, 4 Drawing Sheets

MUD GUARD STRUCTURE HAVING WINDOWS

BACKGROUND OF THE INVENTION

1. Field of the Invention

The present invention relates to a mud guard structure having at least one window, which is mounted on an automotive vehicle such as, for example, a Recreation Utility Vehicle (RUV).

2. Description of the Related Art

Most of the vehicles for off-road utility application such as, for example, RUVs generally make use of a roof that is removable as is disclosed in, for example, the JP Laid-open Utility Model Publication No. S61-51221. More specifically, most of the vehicles for off-road utility application are not equipped with a roof structure under normal conditions of use, but can be equipped with the roof structure when needed or required as an optional item. Also, some of those utility vehicles are equipped with a mud guard installed on both sides of the vehicle body for avoiding an undesirable ingress of muddy soil matter and/or stones, scattered during the travel of the vehicle, into the inside of the vehicle body.

In the utility vehicle equipped with the mud guards, where a side upholstery having a window-attached therein, which is an optional item, is desired to be installed on each side of the vehicle body, the owner of such utility vehicle is required to purchase the roof structure and the side upholsteries and then to remove the existing mud guard so that the utility vehicle can be used as a so-called "fully enclosed" car with the side upholsteries and the roof structure installed. The mud guard once removed is not used until the necessity to use the vehicle as the original, open-air vehicle comes next time.

SUMMARY OF THE INVENTION

The present invention has been designed in view of the foregoing and is intended to provide a window-attached mud guard assembly, in which a window and/or a roof can be fitted in a vehicle of a kind, utilizing a pivotably supported mud guard, by the utilization of the existing mud guard.

In order to accomplish the foregoing object of the present invention, there is provided, in accordance with the present invention, a window-attached mud guard assembly, which includes a mud guard fitted to a side portion of a vehicle body for pivotal movement between opened and closed position, the mud guard, when in the closed position, covering a lower portion of a vehicle cabin, and a window unit mounted on top of the mud guard. The window unit includes a window body, mounted on top of the mud guard, and a connecting element for connecting the window body with a to-be-connected element provided in the mud guard.

According to the present invention, since the window unit is mounted on the utility vehicle with the utilization of the mud guard, change from a fully open model according to the standard specification to the fully enclosed model can be accomplished easily and inexpensively.

The mud guard is preferably hingedly connected with the vehicle body through a hinge for pivotal movement between the opened and closed positions. This is particularly advantageous in that even when the window unit is fitted to the mud guard, the mud guard can be selectively opened or closed to allow a driver and/or a passenger to get in or out of the vehicle cabin.

In a preferred embodiment of the present invention, the connecting element may include a pillar that is fitted to the window body so as to extend downwardly therefrom and is supported by the to-be-connected element in the mud guard. This is particularly advantageous in that when the pillar is connected with the to-be-connected element, the window unit can be easily fitted to the mud guard through the pillar.

The to-be-connected element is preferably made up of upper and lower to-be-connected elements positioned one above the other, with the lower to-be-connected element having a blind hole defined therein for receiving a lower end portion of the pillar. With the pillar inserted into the blind hole, the pillar can be easily and stably supported.

In another preferred embodiment of the present invention, the window unit may include a lower edge member adapted to be mounted on an upper edge portion of the mud guard. The use of the lower edge member contributes to a stable support of the window unit on the mud guard.

In a further preferred embodiment of the present invention, the mud guard may be supported on a vehicle body through a hinge for pivotal movement between the opened and closed position, in which case the to-be-connected element includes a support member fitted to a mount in the mud guard on which mount the hinge is fixed. This allows the utilization of the mount of a kind having a high rigidity, to firmly secure the support member, which is the to-be-connected element, to the mud guard.

The window-attached mud guard assembly of the present invention may additionally include a triangular window fixed to a vehicle body at a location forwardly of the window body. The use of the triangular window is effective to increase the sealability of a side portion of the vehicle body where the window unit is fitted.

The present invention according to another aspect thereof provides a utility vehicle equipped with the window-attached mud guard assembly of the type referred to above. Specifically, since the window unit is mounted by the utilization of the mud guard, change from a fully open model according to the standard specification to the fully enclosed model can be accomplished easily and inexpensively.

The utility vehicle according to the present invention may additionally include a front window body defining a front surface of a vehicle cabin. According to this structural feature, both of the side and front surfaces of the vehicle body, where sealing is required, can be covered by the side window unit on the side of the vehicle body and the front window.

In the utility vehicle according to the present invention, a pair of the window-attached mud guard assemblies may be employed on opposite sides of the utility vehicle, or alternatively two pairs of the window-attached mud guard assemblies may be employed on opposite sides of the utility vehicle with each pair disposed on front and rear portions of the utility vehicle.

BRIEF DESCRIPTION OF THE DRAWINGS

In any event, the present invention will become more clearly understood from the following description of preferred embodiments thereof, when taken in conjunction with the accompanying drawings. However, the to embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

REFERENCE NUMERALS

22: Front windowpane
30, 32: Mud guard
34, 36: Side window unit
40: Window-attached mud guard device
56: Hinge (Bearing member)
58: Mount
65: Window
60: Recess
70: Pillar (Connecting element)
72: Support member (To-be-connected element)
76: Triangular window
C: Vehicle cabin

DETAILED DESCRIPTION OF THE EMBODIMENTS

Figure 1:
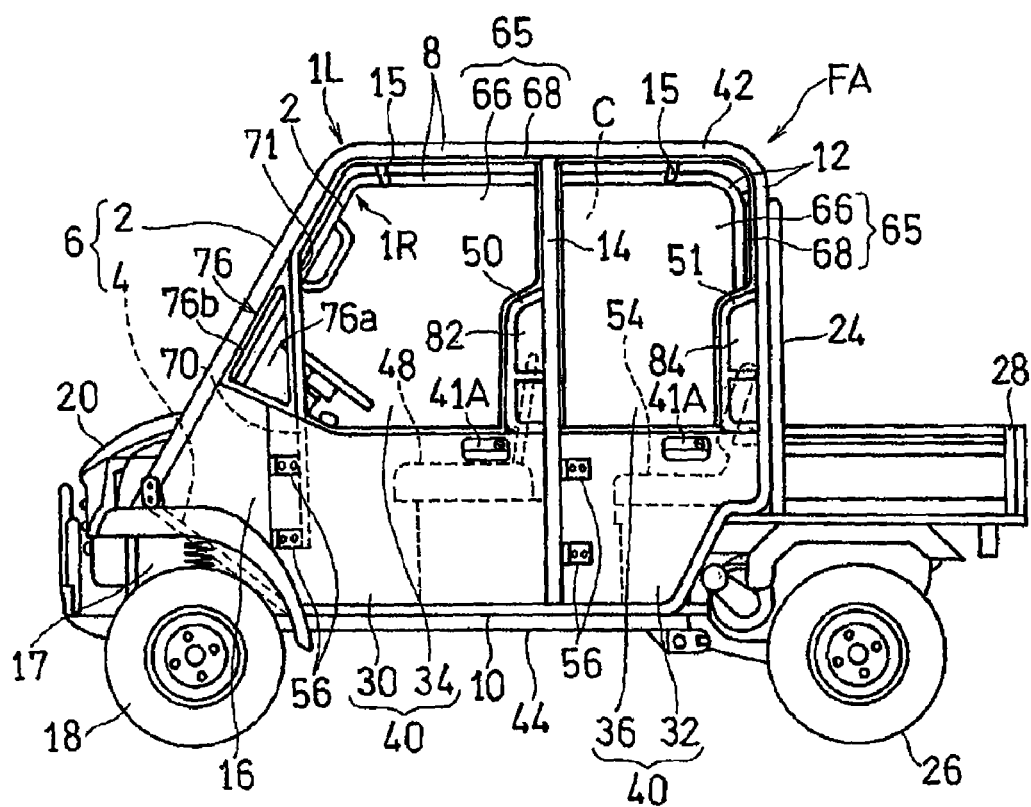
FIG. 1 is a schematic side view showing a utility vehicle equipped with window-attached mud guard assemblies according to a preferred embodiment of the present invention.

Hereinafter, a preferred embodiment of the present invention will be described in detail with particular reference to the accompanying drawings. In particular, FIG. 1 illustrates, in a side representation, a two-row-seater utility vehicle equipped with window-attached mud guard assemblies on left and right sides of the vehicle body. The illustrated utility vehicle includes a vehicle body frame assembly FA, which in turn includes left and right side frames 1L and 1R disposed on left and right sides of the vehicle body. Each of the left and right side frames 1L and 1R includes a front frame segment 6, comprised of a front upper frame piece 2 having a front end and inclined so as to extend rearwardly upwardly and a front lower frame piece 4 having a front end connected with the front end of the front upper frame piece 2 and inclined so as to extend rearwardly downwardly; an upper frame segment 8 extending from a rear end of the front upper frame piece 2 in a direction rearwardly of the vehicle body; a lower frame segment 10 extending from a rear end of the front lower frame piece 4 in a direction rearwardly of the vehicle body. Each of the frames 1L and 1R further includes a rear frame segment 12 connecting a rear end of the upper frame segment 8 and a rear end of the lower frame segment 10 together and extending in a substantially vertical direction; and an intermediate frame segment 14 having upper and lower ends connected respectively with an intermediate portion of the upper frame segment 8 and an intermediate portion of the lower frame segment and extending substantially vertically. The upper frame segments 8 and 8 of the left and right side frames 1L and 1R are connected together by means of front and rear transverse frame segments 15.

The frame segments 6, 8, 10, 12, 14 and 15 are employed in the form of tubular members and are assembled together to define a skeleton structure for a vehicle cabin C as will be described later.

Figure 2:
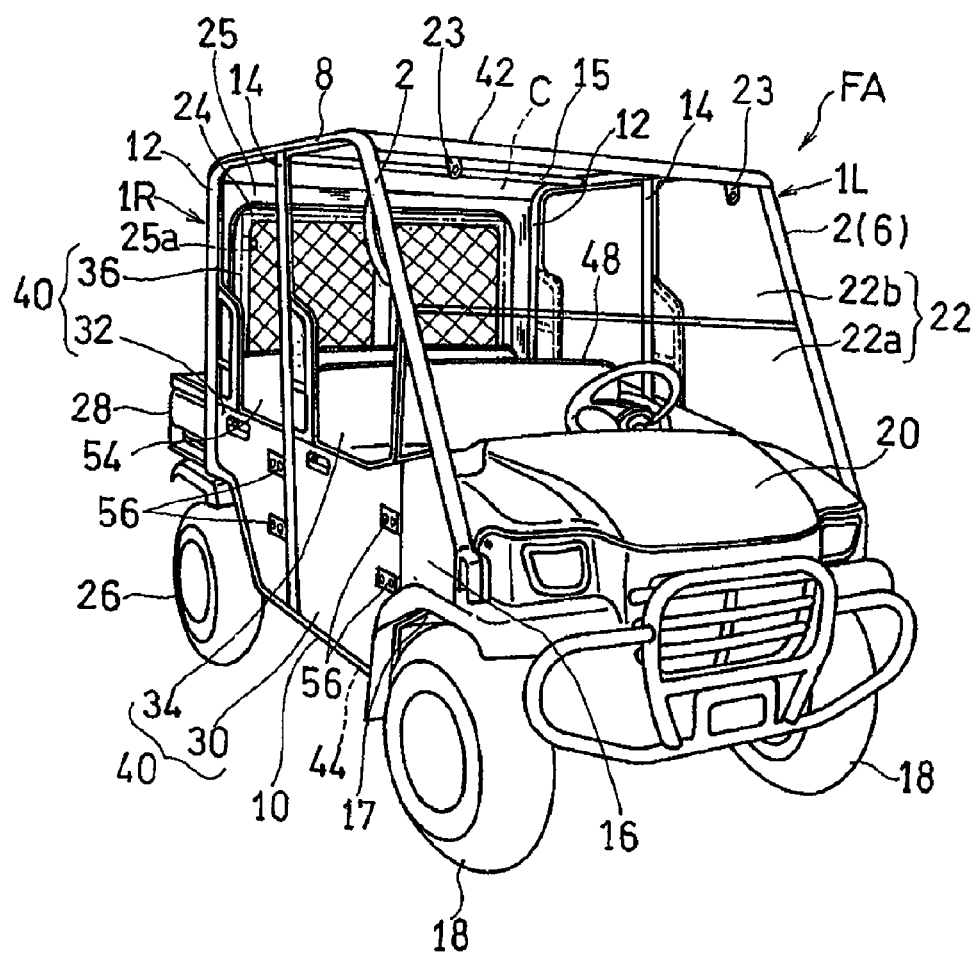
FIG. 2 is a schematic perspective view showing the utility vehicle shown in FIG. 1.

As shown in FIG. 2, a side panel 16 for covering a portion of a front side area of the vehicle body and a front panel 17 for covering a front lower area of the vehicle cabin C of the vehicle body are fitted to the front lower frame piece 4 of each of the left and right front frame segments 6. A combustion engine (not shown) for driving the utility vehicle is mounted beneath a front seat 48. A radiator for the combustion engine and an air cleaner unit, both not shown, and a front wheel 18 are mounted on a front area of the vehicle body including a region of the vehicle body forwardly of the left and right side frames 1L and 1R of the vehicle body frame assembly FA, with a hood 20 mounted so as to overlay the radiator, the air cleaner unit and the front wheel 18.

The front upper frame pieces 2 of the front frame segments 6 carry a front window body or windowpane 22 supported thereby so as to cover a front upper area of the vehicle body. This windowpane 22 is made up of lower and upper halves 22b and 22a. The lower half 22a is secured to the front upper frame pieces 2 and 2, whereas the upper half 22b is hingedly connected with a front edge of a sun top roofing 42, as will be described in detail later, by means of hinges 23 for pivotal movement between a closed position, in which the upper half 22b is held in flush with the lower half 22a as shown, and an opened position in which the upper half 22b is pivoted forwardly and upwardly. The side panels 16 and the front windowpane 22 cooperate with each other to define a front area of the vehicle cabin C of the vehicle body.

A rear guard panel 24 in the form of a roughly meshed screen shield is arranged on a portion of the vehicle body rearwardly of a rear bench seat 54 and a cargo bed 28 is provided rearwardly of the rear frame segments 12 and 12 with rear wheels 26 positioned below the cargo bed 28. A rear open area of the vehicle cabin C is, if required or necessary, covered by a rear cover sheet 25 formed of flexible textile, which is preferably a fabric sheet having a window opening 25a defined therein and covered by a transparent film for rear viewing purpose. This rear cover sheet 25, when not in use, is rolled up around a wind-up pole, which is provided for the sun top roofing 42, and is retained on the sun top roofing 42 in the form as wound around the wind-up pole of the sun top roofing 42. Alternatively, the rear cover sheet 25 may be accommodated in to between the rear guard panel 24 and the rear frame segments 12 and be fixed in position bound to the rear frame segments 12 by means of bands.

Referring again to FIG. 1, a front mud guard 30, which is employed for each side of the vehicle body, is positioned so as to straddle between the front frame segment 6 and the intermediate frame segment 14 to thereby cover a front side lower half area of the vehicle cabin C and is hingedly connected with the side panel 16 for pivotal movement between opened and closed positions. On the other hand, a rear mud guard 32, which is employed for each side of the vehicle body, is positioned so as to straddle between the intermediate frame segment 14 and the rear frame segment 12 to thereby cover a rear side lower half area of the vehicle body and is hingedly connected with the intermediate frame segment 14 for pivotal movement between opened and closed positions. Each of the front and rear mud guards 30 and 32 is made of, for example, a resinous material.

Front and rear side window units 34 and 36 for covering front side and rear side upper halves of the vehicle cabin C are removably mounted on respective upper portions of the front and rear mud guards 30 and 32. More specifically, the front mud guard 30 and the front side window unit 34 cooperate with each other to define a front window-attached mud guard device 40 whereas the rear mud guard 32 and the rear side window unit 36 cooperate with each other to define a rear window-attached mud guard device 40. It is to be noted that in the illustrated embodiment, left and right pairs of the front and rear window-attached mud guard devices 40 are employed for the left and right sides of the vehicle body, respectively, but only one pair of window-attached mud guard devices 40 may be employed for the left and right sides of the vehicle body. Each of the mud guards 30 and 32 is provided with outer and inner door handles 41A and 41B (FIG. 3) on respective outer and inner face thereof for opening/closing the mud guards 30 and 32.

The sun top roofing 42 referred to previously is mounted on and supported by the left and right upper frame segments 8 so as to straddle therebetween to thereby cover a top open area of the vehicle body. This sun top roofing 42 defines an upper surface area of the vehicle cabin C, that is, a roof structure. The lower frame segments 10 have a floor defining panel 44 mounted thereon so as to straddle therebetween as shown in FIG. 2. The floor defining panel 44 defines a lower surface area of the vehicle cabin C, that is, a cabin floor.

As hereinabove described, the side panels 16, the front windowpane 22, the rear cover sheet 25, the mud guards 30 and 32, the side window units 34 and 36, the sun top roofing 42 and the floor defining panel 44 cooperate with each other to define the vehicle cabin C. The vehicle cabin C includes a front bench seat 48 positioned in a front area thereof for a diver and a front passenger. The rear bench seat 54 referred to previously is positioned rearwardly of the front bench seat 48 for rear passengers.

In describing the foregoing embodiment of the present invention, the left and right pairs of the front and rear window-attached mud guard devices 40 have been shown and described as employed. The left and right pairs of the front and rear window-attached mud guard devices 40 referred to hereinbefore are substantially identical in structure with each other and, therefore, in the description that follows, reference will be made only to the right front window-attached mud guard device 40 for the sake of brevity.

Figure 3:
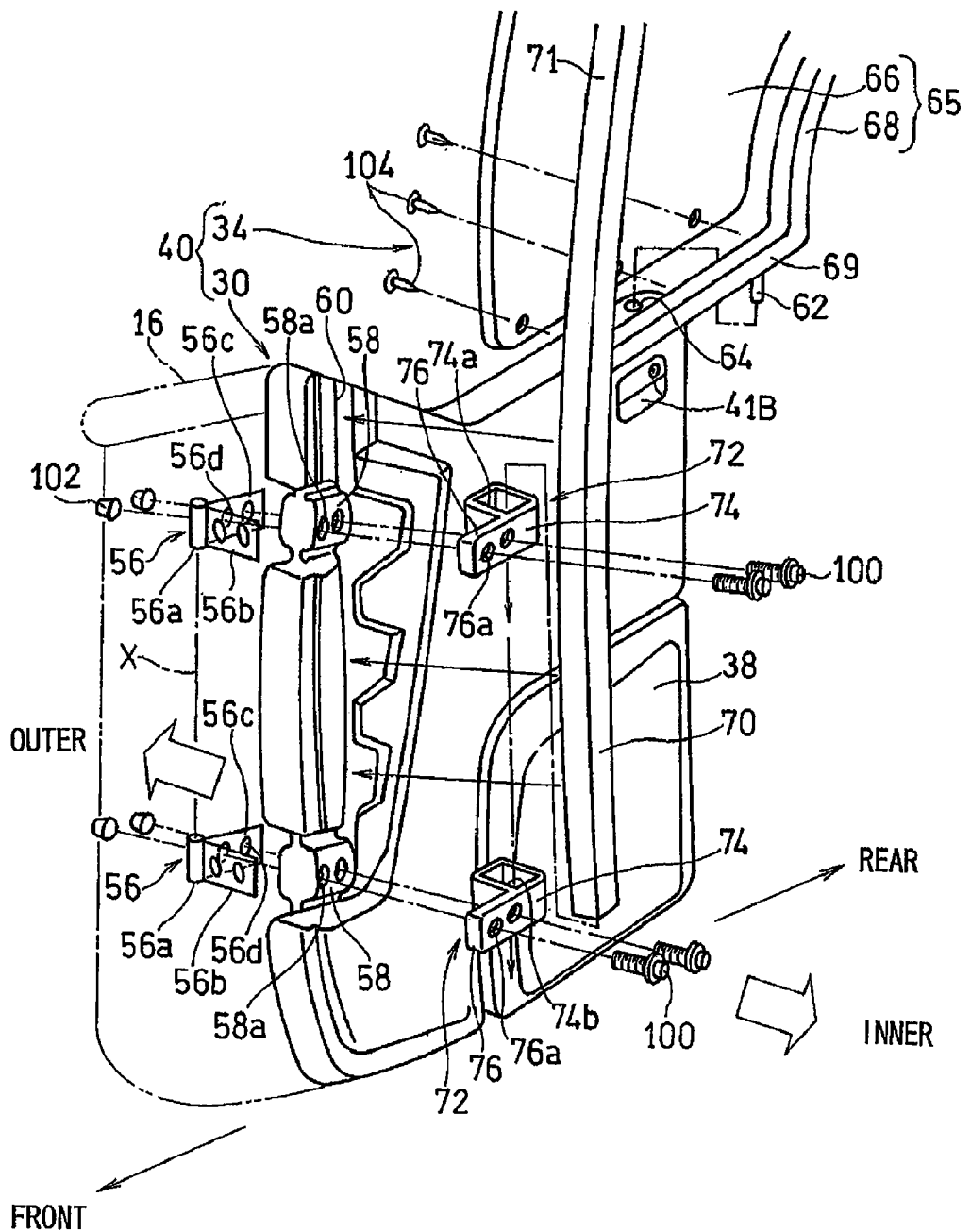
FIG. 3 is an exploded view showing one of the window-attached mud guard assemblies for installation on a right side of the utility vehicle.

Referring now to FIG. 3 showing the right front window-attached mud guard device 40, the front mud guard 30 has a front end supported by the side panel 16 of the vehicle body through upper and lower hinges 56 so that the front mud guard 30 can be selectively moved between opened and closed positions about a common hinge axis defined by upper and lower hinges 56. The upper and lower hinges 56 are each of a type made up of a vertically extending cylindrical hinge pintle 56a, and front and rear hinge leaves 56b, 56c pivotally connected with each other by the hinge pintle 56a. The upper and lower hinges 56 are so arranged as to allow the respective hinge pintles 56a to assume a coaxial relation to each other. The common hinge axis about which the front mud guard 30 can be selectively pivoted relative to the vehicle body is defined by an axis X common to the respective hinge pintles 56a of the upper and lower hinges 56. As a matter of design, each of the hinge leaves 56b and 56c is formed with a plurality of bolt insertion holes 56d defined therein in a predetermined pattern.

It is to be noted that instead of the use of the two hinges 56, only one hinge may be employed.

A front portion of the front mud guard 30 is provided with upper and lower mounts 58, each having mounting holes 58a defined therein, at respective locations level with the upper and lower hinges 56. These mounts 58 are formed integrally with the front mud guard 30 by molding of a resinous material. While in a condition in which the rear hinge leaves 56c of the hinges 56 are held in contact with respective mount outer surfaces (surfaces of the upper and lower mounts 58 oriented laterally outwardly of the vehicle body) with the mounting holes 58a in those mounts 58 aligned with the corresponding bolt insertion holes 56d in the hinge leaves 56c and 56b. Then, bolts 100 are passed through the bolt insertion holes 56d and then through the mounting holes 58a with free ends of those bolts 100 extending outwardly from the mounts 58, and an ornamental nut 102 is threadingly fastened to each of the free ends of the bolts 100. By so doing, the rear hinge leaves 56c of the respective hinges 56 can be fixed to the mounts 58 by means of the bolts 100 and the ornamental nuts 102. The front hinge leaves 56b are secured to the side panel 16 by the use of separate bolts and nuts, both not shown. It will therefore readily be understood that the front mud guard 30 is thus supported by the vehicle body for pivotal movement between the opened and closed positions about the common hinge axis X defined by the hinge pintles 56a.

The illustrated utility vehicle in the form as placed in the commercial market does not have the sun top roofing 42 and the side window units 34 and 36, both best shown in FIG. 1, and, hence, the sun top roofing 42 and the side window units 34 and 36 are separately provided as optional items which the owner of the utility vehicle can buy when necessary or required. Accordingly, the utility vehicle of the structure shown and described in connection with the embodiment of the present invention is so designed that the sun top roofing 42 and the front and rear window units 34 and 36, which are made available as optional items separate from the utility vehicle itself, can be removably mounted on the utility vehicle.

As best shown in FIG. 1, the front side window unit 34 includes a transparent side windowpane 66 made of a transparent acrylic resin and mounted on top of the front mud guard 30 to close an open area laterally of the vehicle cabin C, which is delimited and encompassed by the front frame segment 6, the upper frame segment 8, the intermediate frame segment 14 and the front mud guard 30.

The side windowpane 66 has its perimeter edge reinforced by a pane frame 68. More specifically, the reinforcement pane frame 68 is of a substantially rectangular sectioned configuration and is in the form of a steel member extending continuously over the entire perimeter of the side windowpane 66, having been so shaped as to match with the shape of the side windowpane 66. The side windowpane 66 is fitted to the reinforcement pane frame 68 with the use of a plurality of fastening members 104 such as, for example, tapping screws as shown in FIG. 3. Thus, the side windowpane 66 and the pane frame 58 are so integrated as to provide a side window body 65.

As best shown in FIG. 3, a lower edge member 69 forming a lower portion of the panel frame 58 has a projection 62 formed therein so as to extend downwardly therefrom. The side windowpane 66 can be positioned relative to the front mud guard 30 with the projection 62 inserted into a mounting hole 64 defined in an upper face of the front mud guard 30. The projections 62 and the mounting holes 64 may be employed in a plural number. A front edge member 71 forming a front portion of the pane frame 68 is formed with a pillar 70 so as to protrude downwardly from a lower edge of the side windowpane 66. The side window body 65, including the side windowpane 66 and the pane frame 68, cooperates with the pillar 70 to define the front window unit 34 referred to previously. The front window unit 34 is connected with the front mud guard 30 when the pillar 70 is supported by the vehicle body through upper and lower support members 72 that are fitted to the respective mounts 58. In other words, the pillar 70 serves as a connecting element for connecting the front window unit 34 to the front mud guard 30 and the support members 72 serve as a to-be-connected element. A portion of an inner surface of the front mud guard 30 rearwardly of the mounts 58 is formed with a recess 60, which is depressed laterally outwardly of the vehicle body so that the pillar 70, forming a part of the front side window unit 34, can be received therein.

Each of the upper and lower support members 72 is made of a steel material and is made up of a holder 74 and a fitting lug 76 formed integrally with the holder 74 and having bolt insertion holes 76a defined therein. It is to be noted that the holder 74 of the upper support member 72 has a insert hole 74a defined therein so as to extend completely therethrough whereas the holder 74 of the lower support member 72 has a blind hole 74b defined therein. It is also to be noted that each of the holes 74a defined respectively in the upper and lower holders 74 is of a sectional shape similar to the transverse section of the pillar 70 so that when the latter is inserted through the insert hole 74a in the upper holder 74 until a lower end of the pillar 70 is received within the blind hole 74b in the lower holder 74, the pillar 70 can be mounted to the front mud guard 30.

Each of the upper and lower support members 72 is secured to the corresponding mount 58, fast with the front mud guard 30, together with the associated upper or lower hinge 56 by means of the bolts 100, then passing through the bolt insertion holes 76a in the mounting lug 76, and the ornamental nuts 102. At this time, the mounting lug 76 of each of the upper and lower support members 72 is held in tight contact with the inner face of the corresponding mount 58 fast with the front mud guard 30.

In order for the window unit 34, which is available as an optional item, to be installed on the utility vehicle of a standard specification, the pillar 70, which is a connecting element, is first inserted from above through the bearing hole 74a in the holder 74 of the upper support member 72 until a lower end face of the pillar is seated within the blind hole 74a in the holder 74 of the lower support member 72. At this time, since the hole 74a in the holder 74 of the lower support member 72 is a blind hole as described above, and when the lower end face of the pillar 70 is seated on a bottom wall of the holder 74 of the lower support member 72, the position of the pillar 70 in the vertical direction, that is, the height of the front window unit 34 and the position of the front area of the front window unit 34 in respective directions widthwise and longitudinally of the vehicle body are fixed. At the same time, insertion of the projection 62 integral with the lower edge member 69 of the front window unit 34 into the mounting hole 64 defined in the front mud guard 30 allows the position of the rear area of the front window unit 34 in respective directions vertically, widthwise and longitudinally of the vehicle body to be fixed.

Figure 4:
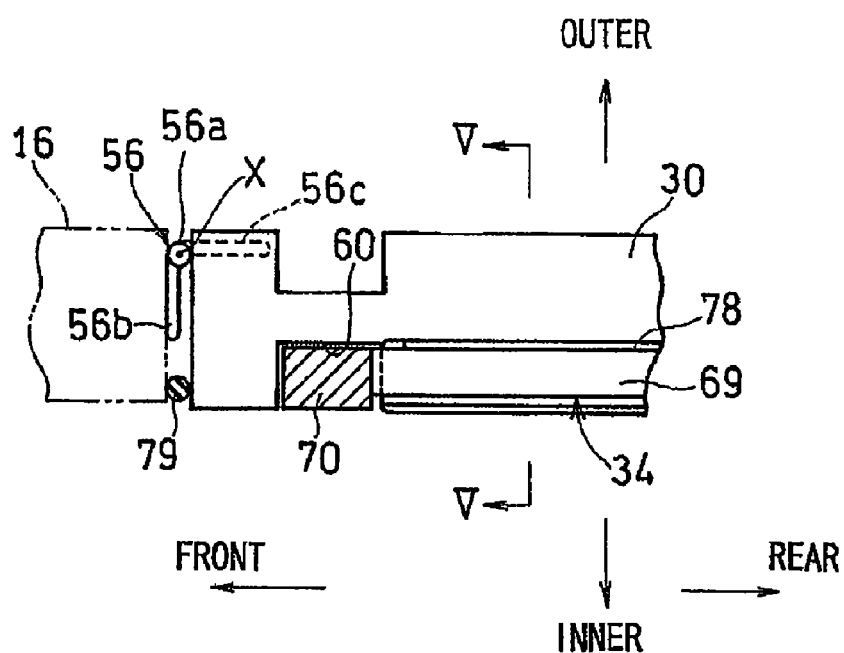
FIG. 4 is a horizontal sectional view as viewed from top, showing a portion of the window-attached mud guard assembly.

As best shown in FIG. 4, the pillar 70 is so arranged as to be inserted into the recess 60 defined in the front mud guard 30 and, accordingly, the lower edge member 69 extending rearwardly of the pillar 70 is held in stable contact with an upper face of the mud guard 30. Also, a packing 79 made of a rubber material is interposed between a rear face of the side panel 16 and a front face of the mud guard 30 to secure a sealing therebetween.

As best shown in FIG. 1, a triangular window 76 is provided forwardly of the side windowpane 66. This triangular window 76 is made up of a transparent triangular windowpane 76a, made of a transparent acrylic resin, and a triangular pane frame 76b made of a steel material and of a triangular configuration extending over the entire perimeter of the triangular windowpane 76a. This triangular window 76 has three side portions that are held in contact with the front upper frame piece 2, the front edge member 71 of the reinforcement pane frame 68 along the pillar 70. The triangular panel frame 76b of the triangular window 76 is supported by the front upper frame piece 2 and the side panel 16 by means of fitting members (not shown) such as, for example, clamps provided in the front frame segment 6.

Figure 5:
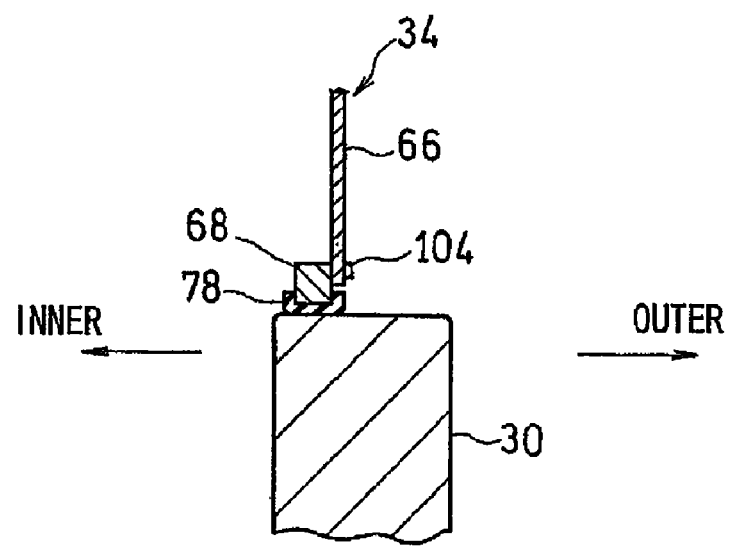
FIG. 5 is a cross sectional view taken along the line V-V in FIG. 4.

A generally U-shaped bearing member 78, made of a rubber material and depressed downwardly, is attached to the upper face of the front mud guard 30, that is, a portion of the front mud guard 30 adjacent the side windowpane 66 as shown in FIG. 5. The reinforcement pane frame 68 for the side windowpane 66 is forcibly engaged in a recess defined in the bearing member 78 having an excellent elasticity, to thereby avoid an undesirable ingress of, for example, water through a gap which would be formed between the side windowpane 66 and the mud guard 30. A similar water tight structure is also employed to seal a gap between the triangular windowpane 76a shown in FIG. 1, the side panel 16 and the front upper frame piece 2 of the front frame segment 6.

A front shoulder guard 50 made of a pipe for protecting an upper half of the body of a driver or an assistant driver, then sitting on the front bench seat 48, from the outside is secured to the intermediate frame segment 14 so as to extend forwardly therefrom. On the other hand, a rear shoulder guard 51 made of a pipe for protecting an upper half to the body of a passenger, then sitting on the rear bench seat 54, from the outside is secured to the rear frame segment 12 so as to extend forwardly therefrom.

An intermediate side panel 82 made of a steel material and of a substantially rectangular configuration is mounted inside the intermediate frame segment 14 and the front shoulder guard 50 so as to extend from a position above a seat back of the front bench seat 48 to a lower portion thereof. Similarly, a rear side panel 84 made of a steel material and of a substantially rectangular configuration is mounted inside the rear frame segment 12 and the rear shoulder guard 51 so as to extend from a position above a seat back of the rear bench seat 54 to a lower portion thereof. These side panels 50 and 51 provide sealing of the vehicle cabin C.

Of various connections with the front mud guard 30, a portion excluding a connection with the previously described side panel 16, more specifically, a connection of the lower frame segment 10, the intermediate frame segment 14 and the intermediate side panel 82 with the front mud guard 30 is fitted with a sealing member (not shown), made of a rubber material, for securing a sealing.

Also, portions of the front frame segment 6, the upper frame segment 8, the intermediate frame segment 14 and the intermediate side panel 82, which are held in contact with the reinforcement pane frame 68, are provided with respective sealing members (not shown), each made of a rubber material, for the purpose of avoiding an undesirable ingress of water or the like into the vehicle cabin C through a gap between the reinforcement pane frame 68 of the front window unit 34 and each of the various frame segments 6, 8 and 14 while the front mud guard 30 is held in the closed position.

The rear mud guard 32 referred to previously is supported by the intermediate frame 14 through upper and lower hinges 56. In order to secure a sealing, a connection with the rear mud guard 32, more specifically, a connection of the rear mud guard 32 with each of the intermediate frame segment 14, the lower frame segment 10 and the rear side panel 84 has a sealing member (not shown) of a rubber material fitted thereto.

A connection of each of the upper frame segment 8, the rear frame segment 12, the intermediate frame segment 14 and the rear side panel 84 with the reinforcement pane frame is also provided with a sealing member (not shown) for the purpose of avoiding an undesirable ingress of water or the like into the vehicle cabin C through a gap between the pane frame 68 of the rear window unit 36 and each of the various frame segments 8, 12 and 14 while the rear mud guard 32 is held in the closed position.

As hereinbefore described, the sun top roofing 42 is available as an optional item and is, therefore, not attached to the utility vehicle in a normal condition. Where the sun top roofing 42 is desired to be mounted on the utility vehicle, it can be fixedly mounted on the upper frame segments 8 in any known manner. When this sun top roofing 42 is mounted on the utility vehicle in this way, the window units 34 and 36 are prevented from coming out upwardly from the mud guards 30 and 32.

According to the present invention fully described hereinabove, since the window units 34 and 36, each being an optionally available item, can be mounted on the utility vehicle with the utilization of the mud guards 30 and 32, change from a fully open model according to the standard specification to the fully enclosed model can be accomplished easily and inexpensively. Also, even in the fully enclosed model, the mud guards 30 and 32 are utilized as components forming respective parts of the vehicle cabin and, therefore, the number of extra members to be separately added can be reduced.

Also, since the mud guard 30 is hingedly connected to the vehicle body through the hinges 56 shown in FIG. 3, the mud guard 30 can be selectively opened or closed, even in a condition with the window unit 34 is fitted to the front mud guard 30, to allow the driver or assistant to get in or out of the vehicle cabin.

Connection of the pillar 70 from above to the support members 72 is advantageous in that the window unit 34 can be easily fitted to the mud guard 30 through the pillar 70.

Since the two support members, i.e., the upper and lower support members 72 are employed with the lower support member 72 having the bottom wall for the blind hole 74b, insertion of the pillar 70 into the blind hole 74b is effective to allow the pillar 70 to be easily and stably supported.

Since the lower edge member 69 of the window unit 34 is mounted on an upper edge portion of the mud guard 30, the window unit 34 can be stably supported on the mud guard 30 through the lower edge member 69.

Also, since the mud guard 30 is hingedly supported by the utility vehicle for selective opening or closing and the support members 72 are secured to the mounts 58 on which the respective hinges 56 are fixed, the support members 72, which are the to-be-connected elements, can be firmly secured to the mud guard 30 by the utilization of the mounts 58 having a high rigidity.

In addition, the use of the triangular window 76 forwardly of the side window body 66 as shown in FIG. 1 is advantageous in that the sealability on each side of the vehicle body, where the window unit 34 is fitted, can be increased.

Yet, since the front windowpane 22 defines a front surface of the vehicle cabin C, both of the side surface and the front surface of the vehicle body, which require sealing, can be advantageously covered by the window units 34 and 36 and the front windowpane 22.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A window-attached mud guard assembly which comprises:
   a mud guard configured to be fitted to a side portion of a vehicle body for pivotal movement between an opened and a closed position, the mud guard, when in the closed position, covering a lower portion of a vehicle cabin,
   a window unit mounted on top of the mud guard and including a window body, mounted on top of the mud guard, and a connecting element for connecting the window body with a to-be-connected element provided in the mud guard, wherein the connecting element comprises a pillar that is fitted to the window body so as to extend downwardly therefrom and is supported by the to-be-connected element in the mud guard, and
   wherein the to-be-connected element has a support hole into which the pillar is inserted, at a location wherein the mud guard is hingedly connected with the vehicle body through a hinge for enabling a pivotal movement between the opened and closed positions, and
   in which the to-be-connected element is secured to the mud guard together with the hinge by means of a fastening member.

2. A window-attached mud guard assembly which comprises:
   a mud guard configured to be fitted to a side portion of a vehicle body for pivotal movement between an opened and a closed position, the mud guard when in the closed position, covering a lower portion of a vehicle cabin, and
   a window unit mounted on top of the mud guard and including a window body, mounted on top of the mud guard, and a connecting element for connecting the window body with a to-be connected element provided in the mud guard,
   in which the connecting element comprises a pillar that is fitted to the window body so as to extend downwardly therefrom and is supported by the to-be-connected element in the mud guard, and the to-be-connected element comprises upper and lower to-be-connected elements positioned one above the other, the lower to-be-connected element having a blind hole defined therein for receiving a lower end portion of the pillar.

3. The window-attached mud guard assembly as claimed in claim 1, in which the window unit comprises a lower edge member adapted to be mounted on an upper edge portion of the mud guard.

4. The window-attached mud guard assembly as claimed in claim 1, in which the mud guard is supported on a vehicle body for pivotal movement between the opened and closed position and in which the to-be-connected element comprises a support member fitted to a mount in the mud guard on which mount the hinge is fixed.

5. The window-attached mud guard assembly as claimed in claim 1, further comprising a triangular window fixed to a vehicle body at a location forwardly of the window body.

6. The window-attached mud guard assembly as claimed in claim 1, wherein the mud guard is formed of a resinous material.

7. The window-attached mud guard assembly as claimed in claim 1, wherein the connecting element includes a reinforcement pane frame fastened adjacent a perimeter of the window unit.

8. The window-attached mud guard assembly as claimed in claim 7, wherein the reinforcement pane frame is a substantially rectangular metal member with the pillar extending downward from the window body.

9. The window-attached mud guard assembly as claimed in claim 6, wherein the mud guard is configured to have an open recess on an interior vehicle side of the mud guard to accommodate a recessed location of the pillar, when the window body is secured to the mud guard.

10. The window-attached mud guard assembly as claimed in claim 2 wherein the mud guard includes integrally formed upper and lower mounts connected respectively to the upper and lower to-be-connected elements and to upper and lower hinges that enable fastening to the vehicle body for pivotal movement wherein the pillar is secured to the mud guard and provides structural support adjacent the upper and lower hinges.

11. The window-attached mud guard assembly as claimed in claim 2 wherein the mud guard is a molded resinous material.

\* \* \* \* \*

UNITED STATES PATENT AND TRADEMARK OFFICE
CERTIFICATE OF CORRECTION

| | |
|---|---|
| PATENT NO. | : 8,336,951 B2 |
| APPLICATION NO. | : 12/648222 |
| DATED | : December 25, 2012 |
| INVENTOR(S) | : Ichihara et al. |

It is certified that error appears in the above-identified patent and that said Letters Patent is hereby corrected as shown below:

Title Page:

(73) Assignees: "Sank Co., Ltd." should read --Sanko Co., Ltd.--;

Beneath the Abstract, the number of claims in the patent should read --8 Claims--, not "11 Claims".

In the Claims:

Claims 2, 10 and 11 should be cancelled as they were not allowed and should not be listed in the patent.

Signed and Sealed this
Thirtieth Day of July, 2013

Teresa Stanek Rea
*Acting Director of the United States Patent and Trademark Office*